United States Patent [19]

Alexanian et al.

[11] Patent Number: 5,254,651
[45] Date of Patent: Oct. 19, 1993

[54] ROOM TEMPERATURE CURING, ALTERNATING ISOPROPENYL-DIMETHYLBENZYLISOCYANATE COPOLYMERS HAVING HIGH ISOCYANATE FUNCTIONALITY

[75] Inventors: Vazken Alexanian, Darien; Robert G. Lees, Stamford; Denise E. Fiori, Trumbull, all of Conn.

[73] Assignee: American Cyanamid Company, Stamford

[21] Appl. No.: 897,205

[22] Filed: Jun. 11, 1992

Related U.S. Application Data

[62] Division of Ser. No. 177,208, Apr. 4, 1988.

[51] Int. Cl.$^5$ .......................... C08F 4/32; C08F 226/02
[52] U.S. Cl. .................................. 526/232.5; 526/301
[58] Field of Search ............................... 526/301, 232.5

[56] References Cited

U.S. PATENT DOCUMENTS

| | | |
|---|---|---|
| 2,606,892 | 8/1962 | Kropa et al. |
| 3,290,350 | 12/1966 | Hoover |
| 4,604,439 | 8/1986 | Colvin et al. |
| 4,608,314 | 8/1986 | Turpin et al. |
| 4,754,011 | 6/1988 | Dexter et al. |

FOREIGN PATENT DOCUMENTS

| | | |
|---|---|---|
| 0130323 | 1/1985 | European Pat. Off. |
| 0164521 | 12/1985 | European Pat. Off. |
| 1745279 | 5/1961 | Fed. Rep. of Germany |

*Primary Examiner*—Joseph L. Schofer
*Assistant Examiner*—N. Sarofin
*Attorney, Agent, or Firm*—M. J. Kelly; F. M. Van Riet; B. E. Lerman

[57] ABSTRACT

Substantially alternating, organic solvent soluble copolymers of 2000 to 4000 molecular weight useful as crosslinking agents and containing monomeric units derived from monomers comprising (i) 40 to 50 mole percent of an isopropenyl-$\alpha,\alpha$-dimethylbenzyl isocyanate, and (ii) 60 to 45 mole percent of an unsaturated ester are described together with processes for their preparation. Curable compositions containing the copolymer and an isocyanate reactive material are also described.

23 Claims, No Drawings

ROOM TEMPERATURE CURING, ALTERNATING ISOPROPENYL-DIMETHYLBENZYLISOCYANATE COPOLYMERS HAVING HIGH ISOCYANATE FUNCTIONALITY

This is a divisional of co-pending application Ser. No. 07/177,208, filed on Apr. 4, 1988.

BACKGROUND OF THE INVENTION

1. Field of the Invention:

This invention relates to isocyanate functional copolymers which permit low temperature crosslinking of curable compositions.

2. Description of the Prior Art:

U.S. Pat. No. 3,290,350 discloses the copolymerization of isopropenyldimethylbenzylisocyanate with ethylene using free-radical type initiators. The resultant copolymers are of poor solubility in benzene and low isocyanate content.

German Patent 1,745,279 describes in Example 5 the azo catalyzed copolymerization of p-TMI with methyl acrylate at a low 82% conversion.

U.S. patent application Ser. No. 499,961 filed Jun. 1, 1982, and now abandoned, describes copolymers of meta- or para-isopropenyl-$\alpha,\alpha$-dimethylbenzyl-isocyanate (hereinafter, "m/p TMI") with certain unsaturated comonomers. The text of patent application Ser. No. 499,961 has been published by the European Patent office as EP 0 130323 A2. The primary technical disclosure of Ser. No. 499,961 is the use of a relatively high molecular weight isocyanate polymer (e.g., M. W. 6400-17400) in conjunction with a low molecular weight polyhydroxy compound (e.g., diethylene glycol, 1,2,6-hexanetriol, trimethylolpropane). Ser. No. 499,961 exemplified copolymers were not able to successfully cure in combination with low molecular weight polyols at room temperature within a period of four days. The single instance of room temperature cure recited in Ser. No. 499,961 was for a high molecular weight terpolymer "Y" containing 15 mole percent m-TMI, 40 mole percent butylacrylate, and 45 mole percent methylmethacrylate cured with trimethylolpropane cured in seven days using unconventionally high levels of tin curing catalyst (viz., 1% organotin compound based on weight of terpolymer solids). Moreover, at room temperature, the formulation of terpolymer "Y" and trimethylolpropane was not homogeneous.

Patent application Ser. No. 563,882 filed Dec. 21, 1983, now abandoned, and copending patent application 07/113,337 filed Oct. 22, 1987 are continuations-in-part of Ser. No. 499,961 and describe copolymers of m/p TMI with various unsaturated comonomers. These patent applications contain a single exemplification of a seven day room temperature cure.

Subsequent experimentation has failed to achieve a consistent 4 day or less room temperature cure by following the examples or general teaching of Ser. No. 499,961 or its continuation-in-part applications.

None of the prior art copolymers of m/p-TMI possess all of the combined advantageous properties required for a practical isocyanate functional copolymeric crosslinking agent.

It is desirable to prepare m/p TMI copolymers which have the following collective advantages over the prior art:

1. Room temperature curable in 4 days or less.
2. High isocyanate functionality (over 40 mole % m/p TMI)
3. High Organic solvent solubility
4. Low molecular weight
5. Ability to cure polyhydroxy, carboxy, or amino bearing materials.
6. Low residual m/p TMI.

SUMMARY OF THE INVENTION

This invention is a crosslinking copolymer containing (i) at least 40 and up to 50 mole percent of units derived from m/p TMI.

This invention is also a process for preparing room temperature curing copolymers containing (i) at least 40 and up to 50 mole percent of units derived from m/p TMI.

This invention is also a curable composition comprising (i) a crosslinking copolymer of m/p TMI and (ii) an isocyanate reactive material.

This invention is also a room temperature curable composition comprising (i) a crosslinking copolymer of m/p TMI, (ii) an isocyanate reactive material, and (iii) a curing catalyst.

This invention is also a crosslinked article or coating formed from heat activating the curable compositions of the invention.

DETAILED DESCRIPTION OF THE INVENTION

Characteristics of the Copolymer of the Invention

The m/p TMI copolymers of the invention have the following defining characteristics:

1. Room temperature cure with isocyanate reactive materials (within four days at 25° C.).
2. Highly soluble in organic solvents.
3. Contain from 40 to 50 mole percent of units derived from m/p TMI.
4. Reactive isocyanate functionality of at least about 8 weight percent.
5. Molecular weight (Mn) of from about 2000 to about 4000.
6. Low residual m/p TMI.

The copolymers of this invention are not limited by any theory of structure but it is believed that they are substantially alternating and linear, that is, the copolymer units derived from m/p TMI are bonded only to units derived from another polymerizable unsaturated comonomer (non-m/p TMI). Therefore, the m/p TMI mole proportion of the copolymer of the invention does not exceed 50 mole percent.

The alternating character of the copolymer of the invention is maintained by the polymerization method taught herein. The comonomer is required to be an unsaturated ester, however, some slight variation of composition is possible. Such variation may occur by the inclusion of small (up to 5 mole percent) non-interfering amounts of unsaturated non-isocyanate reactive comonomers, so that copolymer products having as little as 40 mole percent of units derived from m/p TMI are considered "alternating" within the meaning of this invention. However, the preferred alternating copolymers of this invention contain at least 47 mole percent of units derived from m/p TMI.

The term, "organic solvent soluble" is defined herein as a copolymer soluble to the extent of 2 parts by weight copolymer dissolved in 1 part by weight of 1-methoxy-2-propanol acetate at 25° C. Organic solvent solubility is a function of the copolymer's molecular weight. Preferred copolymers of the invention are organic solvent soluble in all proportions. The number average molecular weight (Mn) of the copolymers of the invention are from about 2000 to about 4000, with the range of 2800 to 3600 being particularly preferred.

The copolymers of the invention are required to have a high level of isocyanate functionality available for crosslinking in curable compositions. Thus, at least 8 weight percent based on the weight of copolymer of isocyanate functionality is present in the copolymer. The level of unreacted m/p TMI in the copolymer may be determined by gas chromatographic analysis.

The copolymers of the invention have a relatively narrow molecular weight distribution or polydispersity. This polydispersity measured as "d" is the ratio of weight average molecular weight divided by number average molecular weight (Mw/Mn) and is required to be no more than 2.2.

It is believed the reaction zone copolymer product should have no more than 1 weight percent of unconverted m/p TMI to be acceptable. In addition, the reaction zone copolymer product must have a "% f<2" of 2.5 or less. The "% f<2" measurement is defined as the percentage of components in the reaction zone product having an average isocyanate functionality of 2 or less.

The copolymer of this invention may be in the form of a purified solid polymer or a polymer dissolved in a solvent. Most preferred is the copolymer in the form of the reaction product of the invention with little or no additional purification.

The Process for Making the Alternating Isocyanate Functional Copolymer of the Invention: General The copolymer of the invention is prepared by the free-radical polymerization of the m/p TMI reactant with one or more unsaturated polymerizable esters as described by the following chemical formula:

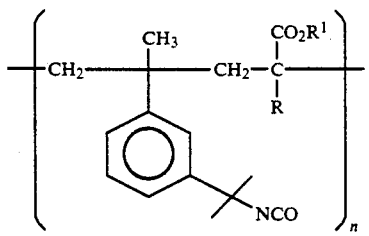

wherein $R^1$ is an organic radical and R is a hydrogen or methyl radical and n is an integer between 5 and 20.

The polymerization conditions set out below are critical to prepare the room temperature curing copolymer of the invention:
1. Monomer selection.
2. Suitable ratio of monomer to solvent in reaction zone.
3. Order of addition of reactants.
4. Free-radical initiator selection.
5. Use of chain transfer agents if low initiator concentrations are used.
6. m/p TMI conversion of at least 99%.

Suitable Monomers for the Polymerization Process

The m/p TMI essential reactant of the invention may be meta isopropenyl-α,α-dimethylbenzyl isocyanate; para-isopropenyl-α,α-dimethylbenzyl isocyanate or mixtures thereof.

The essential unsaturated comonomer reactant comprises as its major component from 60 to 45 mole percent of an unsaturated ester or mixture of unsaturated esters capable of free-radical polymerization. Suitable comonomers are unsaturated acrylates and methacrylates of from 4 to 12 carbon atoms. Particularly preferred as unsaturated comonomers are methyl acrylate (MA), ethyl acrylate, propyl acrylate, butyl acrylate (BA), ethylhexylacryate, methylmethacrylate, ethylmethacrylate, butylmethacrylate, ethylhexylmethacrylate, and mixtures thereof.

The most preferred unsaturated acrylate comonomers used in the preparation of the copolymer of the invention are methyl acrylate, butyl acrylate, and mixtures thereof.

It is possible to incorporate into the copolymer product small amounts of additional monomers which do not hinder the utility of the polymer. Thus, the comonomeric reactant may contain up to 5 mole percent of a non-isocyanate reactive monomer such as unsaturated aromatic compounds, alkenes, and unsaturated esters such as maleates and fumarates. Other specific suitable comonomeric reactants include α-methylstyrene, vinyl acetate, acrylonitrile, propene, and dodecene.

The polymerization process of this invention has a number of critical parameters needed to achieve the characteristics of the copolymer of the invention and the essentially complete reaction the the m/p TMI monomer. It has been found that the conversion of the m/p TMI monomer must be in excess of 99 percent, because higher levels of unreacted m/p TMI are deleterious to the curing properties of the product copolymer when employed in curing compositions. Residual unreacted m/p TMI is monofunctional and effectively caps isocyanate reactive groups in the curing composition. Operation according to the process described herein results in at least 99 weight percent of the m/p TMI charged to the reaction zone being incorporated into the copolymer product.

It has been found that the polymerization process of this invention forms substantially alternating copolymers and does not form significant (not more than trace) amounts of either m/p TMI homopolymers or copolymers wherein the m/p TMI content is above 50 mole percent.

The Liquid Solvent Reaction Zone

The reaction zone for the polymerization process contains a non-interfering non-polymerizable liquid which is a solvent both for the monomers and copolymer products of the invention. Suitable reaction media are selected from a non-reactive non-polymerizable liquid selected from the group consisting of esters, ketones, ethers, aromatic hydrocarbons, chlorinated hydrocarbons, aliphatic hydrocarbons, and mixtures thereof. Illustrative solvents are ethyl acetate, butylacetate, toluene, xylene, methyl ethyl ketone, 2-heptanone, 1,1,1-tri-chloroethane or mixtures thereof. The use of 1-methoxy-2-propanol acetate as a reaction media solvent is particularly preferred.

The weight ratio of monomers to total solvent is critical to the process of the invention. Thus, the final weight ratio of monomers dissolved into the solvent reaction medium should be from about 2:1 to about 20:1. It is a discovery of this invention that processes conducted with lower ratios of monomer to solvent (i.e., more solvent) do not yield copolymers with all the desired properties described herein.

Typically, in the process as taught herein, solvent is added both to the polymerization zone and to the reactor charge. The proportion of solvent in the reactor charge is usually less than 50 weight percent of the total weight of solvent used in the polymerization process.

Low monomer to solvent ratios typically result in reaction zone products having high residual unreacted m/p TMI and may require removal of excess solvent from highly viscous copolymeric solutions.

Order of Addition of Reactants to the Polymerization Zone

The method of adding reactants to the process of the invention is important to obtaining the desirable characteristics of the copolymer product.

It is a critical aspect of this invention that organic solvent soluble, high isocyanate functional copolymers of the invention are formed by simultaneously adding the essential monomers and free-radical initiator into the reaction zone initially containing the liquid solvent medium for conducting the polymerization.

The simultaneous addition of reactor charge ingredients comprising monomers, initiator, and optionally, chain transfer agent is accomplished by premixing these ingredients shortly before the polymerization reaction. Alternatively, streams of ingredients may be combined just at the time of introduction into the reaction zone. Inferior copolymer properties such as insoluble gel formation, low conversion (less than 99%), and failure of curable compositions containing the copolymer (failure to cure in 4 days) result when, for example, the m/p TMI monomer is added to the reaction zone and the other reactant is thereafter added.

The m/p TMI monomer and unsaturated comonomer ingredients are typically added to the reaction zone in the mole proportions desired in the final copolymer product. Thus, by the practice of this invention copolymers are prepared containing monomeric units derived from 40 to 50 mole percent m/p TMI with the balance derived from the unsaturated comonomer.

The polymerization of the invention may be conducted by either a batch or continuous method. The batch process is desirably operated by gradually adding the essential monomers, catalyst, and other materials into the reaction zone containing solvent. The proper rate of addition may be judged by monitoring the exotherm of the polymerization reaction. It may be desirable in the batch process to add additional catalyst after all ingredients have been added to the reaction zone in order to insure complete reaction. At the conclusion of the reaction, distillation may be optionally used to reduce the level of any unreacted unsaturated ester or residual solvent.

The time and temperature of the polymerization reaction are not critical and generally vary from about ½ to 24 hours at reaction temperatures ranging from about 100° C. to about 150° C. The polymerization is usually conducted at autogeneous pressure although subatmospheric or superatmospheric pressures may be employed if desired.

Suitable Free-Radical Initiators

A further critical aspect of the process of the invention necessary to obtaining the property of 4 day or less room temperature curing requires use of selected free-radical initiators. Common initiators used for free radical polymerization of unsaturated monomers are generally unsatisfactory in the process of the invention. For example, azo-type initiators result in unacceptable levels of unreacted m/p TMI monomer or too great a polydispersity in the molecular weight distribution. Aliphatic peroxides typically give copolymer products having an unacceptable degree of yellowing but are otherwise satisfactory.

Perester type peroxides of the following generic formula are preferably used in the practice of the invention:

$$R_1-C(O)-O-O-R_2$$

wherein $R_1$ is an aliphatic or aromatic radical and $R_2$ is a tertiary alkyl radical.

Particularly preferred initiators for use in the process of the invention are peresters wherein $R_1$ is an aliphatic radical such as t-butyl- and t-amyl-.

Generally, the perester initiator is used at a concentration of less than 20 weight percent based on the weight of the total monomers (i.e., TMI and unsaturated ester). Usually the perester initiator is used at concentrations less than 12 weight percent, with a range of from 6 to 12 weight percent being particularly preferred.

It is a critical aspect of the process of this invention that the perester initiator be added to the reaction zone together with the monomeric reactants, as previously stated. However, it is permissible to add most of the peroxide with the monomeric reactants and add a minor amount of peroxide as a finishing step after the polymerization reaction has substantially ended. Such a finishing step has the purpose of removing minor amounts of unreacted monomers and aids in achieving a reaction zone product that may be used directly for the formulation of curable compositions. Thus, it is important that at least 70, and preferably at least 80, weight percent of the peroxide be added with the monomers and other essential ingredients and the balance of perester peroxide, if any, added at substantially the conclusion of the polymerization reaction. The conclusion of the polymerization reaction may be determined by monitoring the exotherm of the reaction zone and gas chromatographic analysis of the reaction mixture to monitor the unreacted TMI levels by gas chromatography.

Use of Chain Transfer Agents

The polymerization process is advantageously conducted in the presence of tertiary amine or a tertiary mercaptan-type chain transfer agent. Tertiary mercaptans are preferred chain transfer agents in the practice of the invention. Failure to use a chain transfer agent will result in use of very high levels of perester initiator or yield a copolymer of too high molecular weight to have the required high organic solvent solubility.

Generally, the chain transfer agent is used at a concentration of less than 10 weight percent based on the weight of monomers added to the reaction zone.

There is a relationship between the levels of perester initiator and mercaptan chain transfer agent employed in the practice of the invention. The initiator must be used to form the product copolymer. Typically, to form copolymer of the required 2000-4000 molecular weight range very high initiator levels (in excess of 15 weight percent based on total monomers) must be used. Much lower initiator levels may be used if mercaptan chain transfer agent is also employed in the reaction zone. Thus, in the operation of the process one may use more initiator with less chain transfer agent or less initiator with more transfer agent depending on the relative cost and convenience of operating the process.

The reaction zone preferably has provision for agitation and heat exchange to assist uniformity and process control.

Purification

The reaction product of the process of the invention is directly usable as the m/p TMI copolymer ingredient in a curable composition formulation. If desired, the reaction zone product may be subjected to distillation (at temperatures less than 150° C.) to remove unreacted unsaturated ester monomer. Other possible purification methods include precipitation from the solvent medium (e.g., addition of non-solvent to the reaction product) or solvent extraction.

The copolymer of the invention may also be chemically modified for suitable applications. Thus, where it is desirable to use "blocked" isocyanates the copolymers of the invention may be reacted with one or more blocking agents as known in the art. Unreacted isocyanate moieties include blocked isocyanate moieties which are capable of deblocking at moderate temperatures, as described in Polyurethane Technology edited by Paul F Bruins, Interscience Publishers, New York, pgs. 11-12. Suitable isocyanate blocking agents include phenol, catechol, hydrogen cyanide, diethyl malonate, ethylacetoacetate, caprolactam, isooctylphenol, 4-hydroxybiphenyl, oximes such as methylethylketone oxime, pyrazole, imidazole, and α-pyrrolidone. Generally, the use of blocking agents is for the preparation of copolymers used in relatively high temperature curing compositions. The temperature of the dissociation of the adduct formed by the blocking agent will generally be in the range of about 80° C. to about 250° C.

The Curable Composition of the Invention

The curable composition of the invention comprises the following ingredients:
(1) a crosslinking effective amount of a substantially alternating, organic solvent soluble copolymer having a molecular weight of from about 2000 to about 4000, having at least about 8 weight percent unreacted isocyanate moieties and containing monomeric units derived from monomers consisting essentially of
  (i) 40 to 50 mole percent of an isopropenyl-α,α-dimethylbenzyl isocyanate, and
  (ii) 60 to 45 mole percent being an unsaturated ester, and
  (iii) from zero to 5 mole percent of a non-isocyanate reactive polymerizable monomer, and;
(2) an isocyanate reactive material.

The isocyanate reactive material is broadly any active hydrogen containing material. In particular, the isocyanate reactive material may contain one or more of hydroxy, amino, amido, mercapto, or carboxy functional groups.

The most important group of isocyanate reactive materials for use in the curable composition of the invention are those containing predominantly or exclusively hydroxyl functionality. Low molecular weight polyols may be used. Suitable examples of low molecular weight polyols are ethylene glycol, proplylene glycol, 1,2-butylene glycol, 1,4-butylene glycol, 1,6-hexylene glycol, glycerol, pentaerythritol, dipentaerythritol, tripentaerythritol, trimethylolethane, trimethylolpropane, anhydroenneaheptitol, (4744-47-2), 1,2,4-butanetriol, 1,2,6-hexanetriol, and mixtures thereof.

Higher molecular weight hydroxyl functional isocyanate reactive materials (Mn=about 800 to about 15,000) include hydroxy functional acrylic resins such as G-Cure TM 867, G-Cure TM 868 (products of Henkel Corp.), hydroxyl-terminated polyesters such as formed by the reaction of diacids and polyols, and hydroxy-terminated polyethers prepared by the base-catalyzed addition of alkylene oxides to polyfunctional alcohols, hydroxy-terminated hydrocarbon polymers (e.g., hydroxy terminated homo- and copolymers of butadiene), hydroxy terminated oligomeric urethanes, polyether polyols, and hydroxyl-terminated graft copolymers are usable in the curable composition of the invention.

Particularly preferred isocyanate reactive materials for use with the m/p TMI copolymers in the curable composition of this invention are commercially available hydroxy group containing acrylic resins. Characteristics of some of these commercial hydroxy containing acrylic resins are as follows:
  a) G-CURE TM 867 Acrylic Resin, product of Henkel Corporation—a hydroxy functional acrylic copolymer reactive with isocyanates. Viscosity—cP @ 25° C.=3500-5000. Hydroxy Equivalent Weight (solid resin)=600.
  b) G-CURE TM 868, Acrylic Resin, product of Henkel Corporation—a hydroxy functional acrylic copolymer reactive with isocyanates. Viscosity—cP @ 25° C.=4500-6500. Hydroxy Equivalent Weight (solid resin)=800.

The curable composition of the invention may consist essentially only of the copolymer of the invention and an isocyanate reactive material. This minimum formulation is capable of curing at high temperatures (viz., above 50° C.). However, it is a principle object of this invention to prepare curable compositions which are room temperature curable. A "Room Temperature Curable Composition" is defined herein as a composition having the ability to develop enough solvent resistance to pass the "MEK Rub Test" (described below) after coating on unprimed panels within 4 days at 25° C.

Isocyanate reactive materials which contain only amino groups as the isocyanate reactive functionality do not require the use of curing catalysts.

The ingredients (1) and (2) are combined with a curing catalyst to give a reactive composition which cures at room temperature. The curing catalyst is selected from those known in the art to promote urethane forming reactions. Suitable examples of curing catalysts having utility in the practice of the invention are organotin compounds or tertiary amines and combinations thereof.

Suitable tertiary amine curing catalysts include triethylenediamine, N-alkyl morpholines, N,N, N',N'-tetramethylethylenediamine, and dialkylalkanolamines. Suitable organotin compounds are stannous octoate, stannous oleate, dimethyl tin dilaurate, tetrabutyldiacetoxystannoxane, dibutyltin dilaurate, dibutyltin di-2-ethylhexoate. Organotin curing catalysts are highly preferred in the practice of this invention. These tin curing agents are typically used at concentrations of about 0.1% to 0.5% based on the weight of polymer forming solids in the curable composition of the invention. Tin curing catalyst levels above 0.5 weight percent are generally undesirable because they likely promote degradation of the physical properties of the final crosslinked polymers.

The curing composition may be in the form of a mixed powder, or dispersed or dissolved together in a solvent or non-solvent.

The ratio of m/p TMI copolymer to isocyanate reactive material is typically such that the mole ratio of isocyanate groups in the copolymer to isocyanate reactive groups in ingredient (2) is from about 1:1.5 to about 1:0.5.

Crosslinked Polymeric Objects of the Invention

Crosslinked polymeric objects of this invention are formed by activating the crosslinking isocyanate groups of the curable composition prepared according to this invention. Crosslinking of the curable composition is achieved by application of heat, ranging from about room temperature (25° C.) for a period of up to four days to about 125° C. using a quick bake cycle for periods as short as ½ minute. Curing at any temperature benefits from the inclusion of curing catalysts.

Relatively high cure temperatures (e.g., above 50° C.) can effect cure even in the absence of curing catalyst. However, room temperature curing is generally not possible for a hydroxy-containing isocyanate reactive material without a cure promoting effective amount of curing catalyst.

The completion of cure of the curable composition was ascertained by a solvent resistance test procedure of rubbing a coating comprising the cured composition with methyl ethyl ketone as solvent. The "MEK Rub Test" was conducted as follows:

A 0.0015 inch (0.0381 mm.) wet film was deposited on a test panel substrate and the film was permitted to cure under the chosen conditions of time and temperature. The panel is fastened to a laboratory bench and rubbed back and forth at 2 pounds (0.9 kg.) pressure by the index finger wrapped with a soft cloth saturated with methyl ethyl ketone. One back and forth motion constituted a stroke. Rubbing was continued with inspection at suitable intervals for evidence of surface marking. The cloth was kept saturated by dipping into MEK solvent after each 10 strokes. The number of strokes necessary to mark the surface and the number of strokes to rub through was recorded as "(mark surface)/(rub through)".

The cured polymeric object of the invention may be in the form of a coating for the protection of a substrate. For example, the cured polymeric coating may be placed upon or impregnated into a substrate to afford protection from corrosive environments. Suitable substrates include wood, metal, and plastics in various structural forms.

The following Examples set forth specific embodiments of the instant invention as well exemplifying the consequences of operating outside of the process of the invention.

EXAMPLE I

Part A

Example I, Part A, illustrates the preparation of the m-TMI/methylacrylate copolymer by the process of the invention.

A 1000 ml. 3 necked flask equipped with a vacuum sealed mechanical stirrer and a double jacketed water condenser with dry ice cold finger condenser attachment was thoroughly purged with argon (at least 24 hours). A cool (under 10° C.) mixture of (i) freshly distilled m-TMI (244.3 g, 1.215 mole), (ii) methyl acrylate (115.1 g, 1.337 mole), (iii) tert-butyl peroctoate (25.00 g), (iv) dodecyl mercaptan (30.0 g), and (v) methoxy propyl acetate (Arcosolv PM Acetate ™, a product of Arco Corporation) solvent (60.0 g.), all stored over molecular sieves was metered into the 1000 ml. flask containing Arcosolv PM Acetate ™ solvent (40.0 g) maintained at about 125° C. over a period of 4 hours with vigorous stirring. After monomer mixture addition was complete, an additional 7.0 grams of tert-butyl peroctoate was added over a period of 90 minutes at 130° C. with continued stirring. After all reagents were added, the reaction mixture was kept at 140° C. for 1 hour and at 150° C. for 30 minutes. The mixture was then cooled to 100° C. and purged with a gentle stream of argon to remove traces of residual methyl acrylate (about 30 minutes) and the as is product at about 98 percent yield was transferred and stored under argon. Isocyanate levels in the copolymer product were determined by dibutylamine titration.

A one liter batch prepared by this procedure had the process parameters and physical properties summarized below:

| | |
|---|---|
| m-TMI monomer charge (g.) | 244.3 |
| unsaturated ester monomer charge, MA (g.) | 115.1 |
| m-TMI mole % of total monomer charge | 47.6 |
| total solvent (g.) | 100.0 |
| total monomer/solvent weight ratio | 3.6 |
| initiator, tert-butyl peroctoate (g.) | 32.0 |
| initiator added with monomers (%) | 78 |
| chain transfer agent, tert-dodecyl mercaptan (g.) | 30.0 |
| isocyanate wt. % in solid copolymer | 11.3 |
| molecular weight (number average by GPC) | 3487 |
| d (polydispersity by GPC) | 1.77 |
| % f < 2 (by GPC) | 0.5 |
| Color (Yellow Index)* | less than 50 |
| converted m-TMI | 99.8 |

*Color value measured by the ASTM D 1638-74 method.

Notes to experimental results

The polydispersity, "d" is Mw/Mn and is an estimate of the degree of molecular weight spread.

The "% f<2" measurement gives the percentage of components in the reaction zone product having a functionality of 2 or less.

Conclusions

The copolymer of Example I Part A is prepared according to the method of the invention.

Part B

This part of the Example shows curing of the copolymer produced in Example I, part A, using G Cure 867 acrylic resin (hydroxy functional acrylic resin, product of Henkel Corporation).

| Cure Rate of m-TMI/MA Copolymers on 1200S Aluminum Using Copolymer of Example IA | |
|---|---|
| FORMULATION | |
| Component A | |
| G Cure 867 (60% Solids) | 10.00 g |
| T-12 (10% Solution) | 0.48 g |
| Arcosolv PM Acetate | 4.10 g |
| | Subtotal 14.58 g |
| Component B | |
| Copolymer of Example IA (77.5% solids) | 4.80 g |
| | Total 19.38 g |

-continued

Cure Rate of m-TMI/MA Copolymers on 1200S Aluminum Using Copolymer of Example IA

FORMULATION

| (component A and B) | |
|---|---|
| Nonvolatiles | 50% |
| Gel Time | 3.0 hr |

Draw-down on 1200S Aluminum
CURE RESPONSE OF m-TMI COPOLYMER FROM EXAMPLE IA

| Acrylic Resin | G Cure 867 |
|---|---|
| Copolymer of Example | IA |
| % T-12* | 0.5 |
| 20 min/125° C. | |
| thick, mils (mm) | 1.1 (0.027) |
| knoop | 18.3 |
| MEK | 200+ |
| 20 min/80° C. | |
| thick, mils (mm) | 1.1 (0.027) |
| knoop | 13.2 |
| MEK | 200+ |
| R.T. 1 Day | |
| thick, mils (mm) | 1.2 (0.030) |
| knoop | 4.8 |
| MEK | 40/90 |
| R.T. 3 Days | |
| knoop | 10.6 |
| MEK | 200+ |
| R.T. 7 Days | |
| knoop | 13.1 |
| MEK | 200+ |
| R.T. 17 Days | |
| knoop | 13.2 |
| MEK | 200+ |

*T-12 is organotin curing agent, Metacure T-12 ™, a product of Air Products Corporation Conclusions The copolymer prepared according to the process of the invention, Part A, when used in a curable composition containing an isocyanate reactive material as in part B cured successfully at room temperature within 4 days.

EXAMPLE II

This Example illustrates the use of another initiator within the invention, t-amyl peroctoate, in the practice of the process of the invention.

Part A

A 5000 ml. 4 necked flask equipped with vacuum sealed mechanical stirrer and a double jacketed water condenser with dry ice cold finger condenser attachment is thoroughly purged with argon. A cool (<10 degree C.) mixture of (i) freshly distilled m-TMI (1466 g., 7.294 mole), (ii) methyl acrylate (658.6 g., 7.658 mole), (iii) tert-amyl peroctoate (159.7 g.), (iv) tert-dodecyl mercaptan (180.0 g.) and (v) Arcosolv PM acetate (400 g.) was metered into the 5000 ml flask containing 200 g. of Arcosolv PM Acetate solvent. A temperature of 125° C. was maintained for a period of 4 hours with vigorous stirring. After monomer mixture addition was complete, an additional 44.7 grams of tert-amyl peroctoate was added over a period of 90 minutes at 123° C. with continued stirring. After all reagents were added, the reaction mixture was kept at 140° C. for 2 hours.

The mixture was then purged at 140° C. with argon to remove traces of residual methyl acrylate (about 30 minutes) and the as is product at about 98 percent yield transferred and stored.

A 5 litter batch prepared by the procedure of Example II had the process parameters and physical properties summarized below:

| | |
|---|---|
| m-TMI monomer charge (g.) | 1466 |
| unsaturated ester monomer charge, MA (g.) | 658.6 |
| m-TMI mole % of total monomer charge | 48.8 |
| total solvent (g.) | 600 |
| monomer/solvent weight ratio | 3.5 |
| initiator, t-amylperoctoate (g.) | 204.4 |
| initiator added with monomers (%) | 78.1 |
| chain transfer agent (g.), tert-dodecyl mercaptan | 180.0 |
| isocyanate wt. % in solid copolymer | 11.9 |
| molecular weight (number average by GPC) | 3345 |
| d (polydispersity by GPC) | 1.47 |
| % f < 2 (by GPC) | 0.1 |
| Color (Yellow Index) | less than 50 |
| converted m-TMI | 99.4 |
| Density (g./cu. cm.) | 1.08 |

Part B

Cure Rate of m-TMI/MA Copolymers on Primed B-100 Panels Copolymers of Example II

| Component A | |
|---|---|
| G Cure 868 (60% Solids) | 13.30 g. |
| T-12 (10% Solution) | 0.58 g. |
| Arcosolv PM Acetate | 4.60 g. |
| Subtotal | 18.48 g. |
| Component B | |
| Copolymer of Example II | 4.50 g. |
| (78.0% solids) | |
| Total | 22.98 g. |
| (component A and B) | |
| Nonvolatiles | 50% |
| Gel Time | 0.75 hr |

Drawdowns on Primed Bonderite-100 Panels
CURE DATA

| Acrylic Resin | G CURE ™ 868 |
|---|---|
| Copolymer of Example | II |
| % T-12 | 0.5 |
| 20°/125° C. | |
| thick, mils (mm) | 1.2 (0.03 mm) |
| knoop | 13.1 |
| MEK | 200+ |
| adhesion | 5 |
| 20°/80° C. | |
| thick, mils (mm) | 1.2 (0.03 mm) |
| knoop | 6.9 |
| MEK | 200+ |
| adhesion | 5 |
| R.T. 2 Days | |
| thick, mils (mm) | 1.2 (0.03 mm) |
| knoop | 2.6 |
| MEK | 200+ |
| R.T. 5 Days | |
| knoop | 4.2 |
| MEK | 200+ |
| R.T. 7 Days | |
| knoop | 6.3 |
| MEK | 200+ |
| adhesion | 5 |

Conclusions

A copolymer according to the invention was prepared using a perester catalyst different from Example I. It cured in less than 4 days at room temperature.

EXAMPLE III

The reaction apparatus and general methodology of Example I was employed except that the polymerization was conducted using a monomer to solvent weight ratio of 2.0:1 and butyl acrylate was used as the comonomer.

A batch prepared by this procedure had the process parameters and physical properties summarized below:

| | |
|---|---|
| m-TMI monomer charge (g.) | 24.43 |
| unsaturated ester monomer charge, BA (g.) | 15.56 |
| m-TMI mole % of total monomer charge | 50.0 |
| total solvent (g.) | 20 |
| monomer/solvent weight ratio | 2.0 |
| initiator, tert-butyl perbenzoate (g.) | 8.0 |
| initiator added with monomers (%) | 86.7 |
| chain transfer agent, tert-dodecyl mercaptan (g.) | none |
| isocyanate wt. % in solid copolymer | 9.4 |
| molecular weight (number average by GPC) | 2000 |
| d (polydispersity by GPC) | 1.7 |
| % f < 2 (by GPC) | 2.2 |
| Color (Yellow Index) | less than 50 |
| converted m-TMI | 99.1 |

Conclusions

This example prepares a copolymer according to the process of the invention using a comonomer (butyl acrylate) and initiator different from that used in Example I.

EXAMPLE IV

This Example illustrates the preparation of the m-TMI/butylacrylate copolymer by a process which uses a free radical initiator different from that called for by the process of the invention.

The reaction apparatus and general methodology of Example I was employed except that the polymerization was conducted using butylacrylate as the unsaturated comonomer.

A one liter batch prepared by the procedure of Example IA had the process parameters and physical properties summarized below:

| | |
|---|---|
| m-TMI monomer charge (g.) | 24.43 |
| unsaturated ester monomer charge, BA (g.) | 15.56 |
| m-TMI mole % of total monomer charge | 50.0 |
| total solvent (g.) | 16.5 |
| monomer/solvent weight ratio | 2.42 |
| initiator, Vazo-52 (azo-type initiator) (g.) | 11.17 |
| initiator added with monomers (%) | 73.1 |
| chain transfer agent, tert-dodecyl mercaptan (g.) | none |
| isocyanate wt. % in solid copolymer | 10.9 |
| molecular weight (number average by GPC) | 1748 |
| d (polydispersity by GPC) | 2.46 |
| % f < 2 (by GPC) | 10.7 |
| Color (Yellow Index) | less than 50 |
| converted m-TMI | 96.8 |

Conclusions

The copolymer process and product of Example IV is outside the scope of the invention. The polydispersity, "d" is too high (maximum acceptable is 2.2) and the level of unreacted monomer, too high (maximum acceptable is 1%), and % f<2 was 10.7, also too high (maximum acceptable value is 2.5).

EXAMPLE V

This Example illustrates the effect of order of addition of polymerization ingredients.

The reaction apparatus and general methodology of Example I was employed except that the polymerization was conducted using an azo-type free-radical initiator (VAZO-52, product of DuPont Company).

The order of adding reactants was changed. Specifically, all of the m-TMI was charged to the polymerization zone, then the comonomer (methyl acrylate), initiator, and chain transfer agent were gradually introduced into the reaction zone over a period of 1.33 hours at a rate of about 15 ml. per hour. At the end of the polymerization reaction 1.0 g. of VAZO-52, 5.22 g. of methyl acrylate, all dissolved in 10 g. of solvent was added to the reaction flask over a period of 1.33 hours.

A one liter batch prepared by the above procedure had the process parameters and physical properties summarized below:

| | |
|---|---|
| m-TMI monomer charge (g.) | 48.86 |
| unsaturated ester monomer charge, MA (g.) | 20.90 |
| m-TMI mole % of total monomer charge | 50.0 |
| total solvent (g.) | 30.0 |
| monomer/solvent weight ratio | 2.5 |
| initiator, VAZO-52 (g.) | 25.0 |
| initiator added with monomers (%) | 76.6 |
| chain transfer agent, tert-dodecyl mercaptan (g.) | none |
| isocyanate wt. % in solid copolymer | 12.2 |
| molecular weight (number average by GPC) | 1405 |
| d (polydispersity by GPC) | 2.1 |
| % f < 2 (by GPC) | 7.0 |
| Color (Yellow Index) | greater than 50 |
| converted m-TMI | 94.8 |

Conclusions

The copolymer produced by the process of Example V was not acceptable because the % f<2 was too high, and the level of unreacted m-TMI was unacceptably high. The copolymer resulting from this "reversed monomer charge" method failed to properly cure at room temperature.

EXAMPLE VI

This Example illustrates the effect of the monomer to solvent ratio.

Part A

Preparation of the Copolymer

The reaction apparatus and general methodology of Example I was employed except that the polymerization was conducted using a monomer to solvent weight ratio of 0.27:1 and butyl acrylate was used as the comonomer.

The initiator used in Example VI was tertiarybutyl perbenzoate, a aromatic perester catalyst within the scope of the invention.

A batch prepared by this procedure had the process parameters and physical properties summarized below:

| | |
|---|---|
| m-TMI monomer charge (g.) | 24.43 |
| unsaturated ester monomer charge, BA (g.) | 15.56 |
| m-TMI mole % of total monomer charge | 50.0 |
| total solvent (g.) | 147.0 |
| monomer/solvent weight ratio | 0.27 |
| initiator, tert-butyl perbenzoate (g.) | 7.5 |
| initiator added with monomers (%) | 86.7 |
| chain transfer agent, tert-dodecyl mercaptan (g.) | none |
| isocyanate wt. % in solid copolymer | 12.1 |
| molecular weight (number average by GPC) | 1400 |
| d (polydispersity by GPC) | 1.2 |
| % f < 2 (by GPC) | 3.2 |
| Color (Yellow Index) | less than 50 |
| converted m-TMI | 91.6 |

Conclusions

The copolymer formed by the process of Example VIA had too low a conversion of m-TMI monomer and too high %f<2.

Part B

Attempt was made to prepare a curable composition using the copolymer prepared in Example VI, Part A. The copolymer (5.97 parts) was mixed with 10.0 parts of G-Cure TM 867 acrylic resin, a hydroxy acrylic resin, (product of Henkel Corp.). The composition also contained 0.047 parts of T-12 curing catalyst used at a concentration of 0.5% of total resins solids, (dibutyltin dilaurate, product of Air Products Corp.). The cure response of the composition is set out below:

| Cure Response of m-TMI Copolymer VIA | | |
|---|---|---|
| Temperature/Time | Knoop | MEK Rub |
| 125° C./20 min. | 15.9 | 200+ |
| 80° C./20 min. | 12.6 | 20/50 |
| R.T./1 day | 3.4 | 10/25 |
| R.T./5 day | 11.2 | 30/130 |

Conclusions

Cure was not successful since the curable composition of Example VIB did not possess the necessary room temperature curing properties. The copolymer used in this composition was prepared using a very low monomer to solvent ratio (too much solvent) and outside the critical process parameter ranges of this invention.

EXAMPLE VII

This Example illustrates the effect of using different free-radical initiators with methyl acrylate comonomer in the polymerization method of the invention. Dialkyl peroxide or azo type free radical initiators are used in the process of the invention.

Part A

The reaction apparatus and general methodology of Example I was employed.

A batch prepared by the procedure of Example VII had the process parameters and physical properties summarized below:

| | |
|---|---|
| m-TMI monomer charge (g.) | 24.43 |
| unsaturated ester monomer charge, MA (g.) | 11.45 |
| m-TMI mole % of total monomer charge | 47.6 |
| total solvent (g.) | 10.0 |
| monomer/solvent weight ratio | 3.6 |
| initiator, di-t-butylperoxide (g.) | 3.7 |
| initiator added with monomers (%) | 81.1 |
| chain transfer agent, tert-dodecyl mercaptan (g.) | 4.0 |
| isocyanate wt. % in solid copolymer | 11.5 |
| molecular weight (number average by GPC) | 2430 |
| d (polydispersity by GPC) | 1.4 |
| % f < 2 (by GPC) | 0.1 |
| Color (Yellow Index) | greater than 50 |
| converted m-TMI | 97.2 |

Conclusions

The process of Example VII, Part A used a catalyst outside the scope of the invention. The percentage of unconverted m-TMI was unacceptably high and a trial curable composition prepared with this polymer failed to cure at room temperature within four days.

Part B

The reaction apparatus and general methodology of Example I was employed, excepting an azo type initiator was used with the methyl acrylate comonomer.

A batch prepared by the procedure of Example VII, part B had the process parameters and physical properties summarized below:

| | |
|---|---|
| m-TMI monomer charge (g.) | 48.86 |
| unsaturated ester monomer charge, MA (g.) | 23.01 |
| m-TMI mole % of total monomer charge | 47.6 |
| total solvent (g.) | 20.0 |
| monomer/solvent weight ratio | 3.6 |
| initiator, Vazo-52 (g.) | 19.35 |
| initiator added with monomers (%) | 84.5 |
| chain transfer agent, tert-dodecyl mercaptan (g.) | none |
| isocyanate wt. % in solid copolymer | 11.6 |
| molecular weight (number average by GPC) | 2150 |
| d (polydispersity by GPC) | 2.49 |
| % f < 2 (by GPC) | 5.4 |
| Color (Yellow Index) | less than 50 |
| converted m-TMI | 97.8 |

Conclusions

The copolymer prepared by the process of Example VII, part B formed a curable composition, capable of cure in less than 4 days at room temperature, however, the copolymer was considered unacceptable on the basis of the too high level of residual m-TMI and the presence of byproducts from the very high level of azo-type catalyst used resulting in % f<2=5.4.

EXAMPLE VIII

This Example illustrates the effect of operating the process of the invention without using a chain transfer agent in the reaction zone.

Part A

The reaction apparatus and general methodology of Example I was employed, excepting a chain transfer agent was not used. Methylacrylate was used as the unsaturated ester comonomer.

A batch prepared by the above procedure had the process parameters and physical properties summarized below:

| | |
|---|---|
| m-TMI monomer charge (g.) | 48.86 |
| unsaturated ester Monomer charge MA (g.) | 23.00 |
| m-TMI mole % of total monomer charge | 47.6 |
| total solvent (g.) | 30.0 |
| monomer/solvent weight ratio | 2.4 |
| initiator, t-butylperoctoate (g.) | 13.64 |
| initiator added with monomers (%) | 74.3 |
| chain transfer agent (g.), tert-dodecyl mercaptan | none |
| isocyanate wt. % in solid copolymer | 13.3 |
| molecular weight (number average by GPC) | 3520 |
| d (polydispersity by GPC) | 1.5 |
| % f < 2 (by GPC) | 0.4 |
| Color (Yellow Index) | less than 50 |
| converted m-TMI | 99.75 |

Part B

| Cure Rate of m-TMI/MA Copolymers on 1200S Aluminum Copolymers of Example VIII | |
|---|---|
| FORMULATION | |
| Component A | |
| G Cure 867 (60% Solids) | 10.00 g. |
| T-12 (10% Solution) | 0.46 g. |
| Arcosolv PM Acetate | 2.80 g. |
| Subtotal | 13.26 g. |
| Component B | |
| Copolymer of Example VIII Part A (64% solids) | 4.90 g. |
| total | 18.16 g. |
| (component A and B) | |
| Nonvolatiles | 50% |
| Gel Time | 2.0 hr. |

| Drawdown on 1200S Aluminum | |
|---|---|
| CURE DATA | |
| Acrylic Resin | G Cure 867 |
| Copolymer of Example | VIII |
| % T-12 | 0.5 |
| 20 min./125° C. | |
| thick, mils (mm) | 1.1 (0.027 mm) |
| knoop | 16.5 |
| MEK | 200+ |
| 20 min./80° C. | |
| thick, mils (mm) | 1.15 (0.028 mm) |
| knoop | 13.1 |
| MEK | 200+ |
| R.T. 1 Day | |
| thick, mils (mm) | 1.2 (0.030 mm) |
| knoop | 5.4 |
| MEK | 200+ |
| R.T. 3 Days | |
| knoop | 10.2 |
| MEK | 200+ |
| R.T. 7 Days | |
| knoop | 10.8 |
| MEK | 200+ |
| R.T. 17 Days | |
| knoop | 11.7 |
| MEK | 200+ |

Conclusions

Very high catalyst levels are needed in the absence of chain transfer agents to obtain copolymers of acceptable molecular weight within the process of the invention.

EXAMPLE IX

This Example illustrates the preparation of a curable composition of the invention with a different hydroxy containing acrylic resin and the use of these compositions to form room temperature cured coatings.

The m-TMI copolymers of Examples VIII-A were used to prepare the curable compositions of this invention.

The specific formulations were as follows:

| | |
|---|---|
| Component A | |
| acrylic resin (1) G Cure 868 (g.) | 26.60 |
| T-12 catalyst (10% Solution) | 1.15 |
| Arcosolv PM Acetate | 8.20 |
| Subtotal | 35.95 |
| Component B | |
| Copolymer of Ex. VIII part A (64.0% solids) | 9.80 |
| Total | 45.75 |

All materials in Component A were mixed together. Component B was added to Component A immediately prior to use because estimated pot life was about one hour.
(1) Acrylic polyol resin (product of Henkel Corporation)
(2) Dibutyl tin dilaurate cure catalyst for isocyanate reaction with hydroxy functional resins, (product of Air Products Corporation).

Preparation of Coatings

Draw-downs were made on primed Bonderite-100 steel test panels from Oxy metals Company following ASTM Standard Practice No. D 4147-82. Three panels were prepared from each formulation and were cured 20 minutes at 125° C., 20 minutes at 80° C., and at room temperature. The experimental results are given below:

| Film Performance | Example VIII-A Copolymer |
|---|---|
| 20 min./125° C. | |
| film thickness, mils (1) | 1.2 (0.03 mm.) |
| knoop hardness (2) | 12.7 |
| solvent resistance, MEK double rubs to remove (3) | 200+ |
| 20 min./80° C. | |
| film thickness, mils (1) | 1.3 (0.0325 mm) |
| knoop hardness (2) | 6.9 |
| solvent resistance, MEK double rubs to remove (3) | 200+ |
| Room Temperature/1 Day | |
| film thickness, mils (1) | 1.2 (0.03 mm.) |
| knoop hardness (2) | 1.5 |
| solvent resistance, MEK double rubs to remove (3) | 150/200+ |
| Room Temperature/2 Day | |
| film thickness, mils (1) | 1.2 (0.03 mm.) |
| knoop hardness (2) | 2.0 |
| solvent resistance, MEK double rubs to remove | 200+ |
| Room Temperature/7 Day | |
| film thickness, mils (1) | 1.2 (0.03 mm.) |

| Film Performance | Example VIII-A Copolymer |
| --- | --- |
| knoop hardness (2) | 7.4 |
| solvent resistance, MEK double rubs to remove (3) | 200+ |

(1) ASTM Standard Method D 1400-81
(2) ASTM Standard Test Method for Indentation Hardness of Organic Coatings D 1474-68
(3) Polymer resistance to methyl ethyl ketone double rubs

EXAMPLE X

This Example illustrates the effect of insufficient (i.e., less than 70% of total) amount of initiator added with monomers.

The reaction apparatus and general methodology of Example I was employed.

A batch prepared by the procedure of Example I had the process parameters and physical properties summarized below:

| | |
| --- | --- |
| m-TMI monomer charge (g.) | 24.43 |
| unsaturated ester monomer charge, BA (g.) | 15.56 |
| m-TMI mole % of total monomer charge | 50.0 |
| total solvent (g.) | 10.0 |
| monomer/solvent weight ratio | 4.0 |
| initiator, t-butylperoctoate (g.) | 4.2 |
| initiator added with monomers (%) | 59.5 |
| chain transfer agent (g.) | 3.0 |
| isocyanate wt. % in solid copolymer | 10.9 |
| molecular weight (number average by GPC) | 3600 |
| d (polydispersity by GPC) | 1.6 |
| % f < 2 (by GPC) | 0.0 |
| Color (Yellow Index) | greater than 50 |
| % converted m-TMI | 99.89 |

Conclusions

The polymerization process of Example X was outside the scope of the invention. Specifically, the major part of the initiator was not added at the same time as the monomers and other essential ingredients. Thus, only 59.5 weight percent of the initiator was added initially to the reaction zone and the balance of initiator added when the polymerization reaction was substantially concluded. The copolymer product of this process did not cure properly at room temperature.

EXAMPLE XI

This Example illustrates the use of all critical conditions within the practice of the process of the invention.

A 500 ml. 4 necked flask equipped with vacuum sealed mechanical stirrer and a double jacketed water condenser with dry ice cold finger condenser attachment is thoroughly purged with argon. A cool (<10° C.) mixture of (i) freshly distilled m-TMI (48.86 g.), (ii) methyl acrylate (22.90 g.), (iii) tert-butyl peroctoate (5.0 g.), (iv) dodecyl mercaptan (6.0 g.) and (v) Arcosolv PM Acetate TM (15.0 g.) was metered into the 500 ml. flask containing 5.0 g of Arcosolv PM Acetate solvent. A temperature of 125° C. was maintained for a period of 4 hours with vigorous stirring. After monomer mixture addition was complete, an additional 1.4 grams of tert-butyl peroctoate was added over a period of two hours at 130° C. with continued stirring. After all reagents were added, the reaction mixture was kept at 150° C. for 30 minutes.

The "as is" product at about 98 percent yield was transferred and stored.

The 0.5 liter batch prepared by the above procedure had the process parameters and physical properties summarized below:

| | |
| --- | --- |
| m-TMI monomer charge (g.) | 48.86 |
| unsaturated ester monomer charge, MA (g.) | 22.90 |
| m-TMI mole % of total monomer charge | 47.6 |
| total solvent (g.) | 20.0 |
| monomer/solvent weight ratio | 3.6 |
| initiator, t-butylperoctoate (g.) | 6.4 |
| initiator added with monomers (%) | 75 |
| chain transfer agent (g.) | 6.0 |
| isocyanate wt. % in solid copolymer | 11.4 |
| molecular weight (number average by GPC) | 3420 |
| d (polydispersity by GPC) | 1.7 |
| % f < 2 (by GPC) | 0.4 |
| Color (Yellow Index) | less than 50 |
| converted m-TMI (%) | 99.2 |
| Density (g./cu. cm.) | 1.08 |

Conclusions

An m-TMI copolymer having all desirable characteristics is prepared by following the practice of the invention.

The copolymer of Example XI was cured with G-Cure TM 867 and G-Cure 868 TM Acrylic Resin with T-12 and UL-28** organotin catalysts. Table 1 describes the formulation and Table 2 summarizes the cure rates.

** FORMREZ UL-28 organotin catalyst, product of Witco Corporation.

TABLE 1

| | | |
| --- | --- | --- |
| G-Cure TM 868 (60% NV*) | — | 13.3 |
| G-Cure TM 867 (60% NV) | 10.0 | — |
| Copolymer of Example XI (80% solids) | 4.6 | 4.6 |
| T-12 or UL-28 (10% NV) | 0.5 | 0.6 |
| Arcosolv PM Acetate | 4.3 | 4.9 |
| | 19.4 | 23.4 |

*NV is non-volatile content

TABLE 2

CURE RATE OF m-TMI/MA COPOLYMER OF EXAMPLE XI

| Acrylic Resin | G-CURE TM 867 | | G-CURE TM 868 | |
| --- | --- | --- | --- | --- |
| % UL-28[1] | 0.5 | — | 0.5 | — |
| % T-12[2] | — | 0.5 | — | 0.5 |
| GEL TIME | 45 min. | 3+ hrs. | 30 min. | 90 min |
| 20 min./125° C. | | | | |
| Thick | 1.0 | 1.0 | 1.0 | 1.1 |
| Knoop | 16.6 | 16.4 | 14.4 | 13.7 |
| MEK | 200+ | 200+ | 200+ | 200+ |
| 20 min./80° C. | | | | |
| Thick | 1.0 | 1.0 | 1.1 | 1.0 |
| Knoop | 14.9 | 13.5 | 10.3 | 8.0 |
| MEK | 200+ | 200+ | 200+ | 150/200 |
| Room Temperature 1 Day | | | | |
| Thick | 1.15 | 1.15 | 1.15 | 1.1 |
| Knoop | 7.9 | 4.9 | 3.2 | 3.0 |
| MEK | 200+ | 30/80 | 150/180 | 70/100 |
| Room Temperature 2 Days | | | | |
| Knoop | 11.5 | 10.4 | 5.0 | 5.7 |

TABLE 2-continued

CURE RATE OF m-TMI/MA COPOLYMER OF EXAMPLE XI

| Acrylic Resin | G-CURE ™ 867 | | G-CURE ™ 868 | |
|---|---|---|---|---|
| MEK | 200+ | 100/200+ | 200+ | 170/200+ |
| Room Temperature 3 Days | | | | |
| Knoop | 13.2 | 12.2 | 6.4 | 6.2 |
| MEK | 200+ | 200+ | 200+ | 200+ |
| Room Temperature 4 Days | | | | |
| Knoop | 13.4 | 12.7 | 7.0 | 6.6 |
| MEK | 200+ | 200+ | 200+ | 200+ |
| Room Temperature 7 Days | | | | |
| Knoop | 14.2 | 14.4 | 7.7 | 7.0 |
| MEK | 200+ | 200+ | 200+ | 200+ |

[1]Organotin catalyst
[2]Organotin catalyst

EXAMPLE XII

This example illustrates the use of all critical process conditions within the scope of the invention.

Part A

A 5000 ml. 4 necked flask was used under the conditions of Example II with four hour addition time at 110°–115° C. More initator was added at 115°–120° C. over a period of two hours and kept at 120° C. for six hours. The "as is" product (after removal of volatiles under reduced pressure at 120° C.) gave an about 98% yield, and was transferred and stored. It had the process parameters and physical properties summarized below:

| | |
|---|---|
| m-TMI monomer charge (g.) | 1466 |
| unsaturated ester monomer charge, MA (g.) | 658.6 |
| m-TMI mole % of total monomer charge | 47.6 |
| total solvent (g.) | 600 |
| monomer/solvent weight ratio | 3.6 |
| initiator, t-amylperoctoate (g.) | 204.4 |
| initiator added with monomers (%) | 78.1 |
| chain transfer agent (g.) | 180.0 |
| isocyanate wt. % in solid copolymer | 12.1 |
| molecular weight (number average by GPC) | 3570 |
| d (polydispersity by GPC) | 1.67 |
| % f < 2 (by GPC) | 0.1 |
| Color (Yellow Index) | less than 50 |
| % converted m-TMI | 99.3 |
| Density (g. cu. cm.) | 1.08 |
| Viscosity (cp) at RT | 9730 |

Part B

Cure Rate of m-TMI/MA Copolymers on Primed B-100 Panels Copolymers of Example XII

| Component A | |
|---|---|
| G Cure 868 (60% Solids) | 13.30 g. |
| T-12 (10% Solution) | 0.58 g. |
| Arcosolv PM Acetate | 4.50 g. |
| Subtotal | 18.38 g |
| Component B | |
| Copolymer of Example XII (75.8% solids) | 4.60 g. |
| Total (Components A and B) | 22.98 g. |
| Nonvolatiles | 50% |
| Gel Time | 0.70 hr. |

Drawdowns on Primed B-100 Panels

| CURE DATA | |
|---|---|
| Acrylic Resin | G Cure 868 |
| Copolymer of Example | XII |
| % T-12 | 0.5 |
| 20 min/125° C. | |
| thick | 1.2 |
| knoop | 12.4 |
| MEK | 200+ |
| adhesion | 5 |
| 20 min/80° C. | |
| thick | 1.2 |
| knoop | 7.2 |
| MEK | 200+ |
| adhesion | 5 |
| R.T. 2 Days | |
| thick | 1.2 |
| knoop | 2.8 |
| MEK | 200+ |
| R.T. 5 Days | |
| knoop | 3.6 |
| MEK | 200+ |
| R.T. 7 Days | |
| knoop | 5.2 |
| MEK | 200+ |
| adhesion | 5 |

Part C

Cure Rate of m-TMI/MA Copolymer of Example XII with Capa 316 ™ Polymer*

| FORMULATION | |
|---|---|
| Component A | |
| CAPA-316 (100% Solids) | 3.9 g. |
| T-12 (10% Solution) | 0.5 g. (0.5% on Nonvolatiles) |
| Arcosolv PM Acetate | 3.9 g. |
| Subtotal | 8.3 g. |
| Component B | |
| Copolymer of Example XII (75.8% Nonvolatiles) | 6.9 g. |
| Total (Component A and B) | 15.2 g. |
| Nonvolatiles | 60% |
| Gel Time (min.) | 0.30 hr. |

Drawdown on 1200S Aluminum

| CURE DATA | |
|---|---|
| 20 min./125° C. | |
| film thickness, mils (mm) | 1.2 (0.03) |
| knoop hardness | 11.4 |
| MEK double rubs to remove | 200+ |
| 20 min./80° C. | |
| film thickness, mils (mm) | 1.2 (0.03) |
| knoop hardness | 7.3 |
| MEK double rubs to remove | 200+ |
| Room Temperature/1 Day | |
| film thickness, mils (mm) | 1.2 (0.03) |
| knoop hardness | 2.6 |

-continued

| Drawdown on 1200S Aluminum | |
|---|---|
| CURE DATA | |
| MEK double rubs to remove Room Temperature/2 Days | 70/100 |
| knoop hardness | 5.5 |
| MEK double rubs to remove Room Temperature/3 Days | 170/200 |
| knoop hardness | 5.5 |
| MEK double rubs to remove | 170/200 |
| Room Temperature/4 Days | Full Cure |

*Capa 316 polycaprolactones, molecular weight 1000, product of INTEROX Co.

Conclusion

An m-TMI copolymer having all desirable characteristics is prepared by the process of the invention.

Although the present invention has been described with reference to certain preferred embodiments, it is apparent that modifications and changes may be made therein by those skilled in the art, without departing from the scope of this invention as defined by the appended claims.

What is claimed is:

1. A proces for preparing a substantially alternating, organic solvent soluble copolymer having a molecular weight of from about 2000 to about 4000, with at least 8 weight percent of unreacted isocyanate functionality and containing monomeric units consisting essentially of (i) 40 to 50 mole percent of an isopropenyl-$\alpha,\alpha$-dimethylbenzyl isocyanate, (ii) 60 to 50 mole percent of an unsaturated ester, and (iii) from zero to 5 mole percent of a non-isocyanate reactive polymerizable monomer, said process comprising the following steps:
   A) simultaneously adding reactor charge materials comprising:
      1. 40 to 50 mole percent meta-/para-isopropenyl-$\alpha,\alpha$-dimethylbenzyl isocyanate monomer;
      2. 60 to 45 mole percent unsaturated ester monomer;
      3. zero to 5 mole percent non-isocyanate reactive unsaturated monomer;
      4. a perester free-radical initiator;
      5. optionally, a solvent; and
      6. optionally, a chain transfer agent, into a reaction zone containing a non-isocyanate reactive solvent, with the proviso that the weight ratio of total monomers to total solvent in the reactor zone is from about 2:1 to about 20:1, and
   B) maintaining the reaction zone of step (A) containing the reactor charge at a temperature and for a time sufficient to polymerize at least 99 weight percent of the meta-/para-isopropenyl-$\alpha,\alpha$-dimethylbenzyl isocyanate monomer.

2. The process of claim 1 wherein the isopropenyl-$\alpha,\alpha$-dimethylbenzyl isocyanate is selected from meta-isopropenyl-$\alpha$, $\alpha$-dimethylbenzyl isocyanate; para-isopropenyl-$\alpha$, $\alpha$-dimethylbenzyl isocyanate; and mixtures thereof.

3. The process of claim 1 wherein the isopropenyl-$\alpha$, $\alpha$-dimethylbenzyl isocyanate is meta-isopropenyl-$\alpha$, $\alpha$-dimethylbenzyl isocyanate.

4. The process of claim 1 wherein the unsaturated comonomer comprises acrylates, methacrylates, and mixtures thereof.

5. The process of claim 1 wherein the comonomer is an acrylate or methacrylate of from 4 to 12 carbon atoms.

6. The process of claim 1 wherein the unsaturated comonomer is selected from the group consisting of methyl acrylate, ethyl acrylate, propyl acrylate, butyl acrylate, ethylhexylacrylate, methylmethacrylate, ethylmethacrylate, butylmethacrylate, ethylhexymethacrylate, and mixtures thereof.

7. The process of claim 1 wherein the monomers consist essentially of from 47 to 50 mole percent of isopropenyl-$\alpha$, $\alpha$-dimethylbenzyl isocyanate, and from 53 to 50 mole percent of an unsaturated ester comonomer.

8. The process of claim 1 wherein the perester initiator is an aliphatic perester.

9. The process of claim 8 wherein the perester initiator is selected from t-butyl peroctoate, t-amyl peroctoate or mixtures thereof.

10. The process of claim 1 conducted at a temperature of from about 100° C. to about 150° C.

11. The process of claim 1 conducted for a period of from about ½ hour to about 24 hours.

12. The process of claim 1 operated as a batch process.

13. The process of claim 1 wherein the perester initiator is used at a concentration of not more than about 20 weight percent based on the weight of meta- and para-isopropenyl-$\alpha$, $\alpha$-dimethylbenzyl isocyanate monomer and other comonomers.

14. The process of claim 1 wherein the perester initiator concentration is from 20 to 4 weight percent of the total weight of meta-/para-isopropenyl-$\alpha$, $\alpha$-dimethylbenzyl isocyanate monomer and other comonomers.

15. The process of claim 8 wherein the chain transfer agent is selected from a tertiary mercaptan or a tertiary amine.

16. The process of claim 13 wherein chain transfer agent is present in the reactor charge in an amount of less than 15 weight percent based on the weight of meta-/para-isopropenyl-$\alpha$, $\alpha$-dimethylbenzyl isocyanate monomer and other comonomers.

17. The process of claim 1 wherein the reactor charge includes a solvent for the monomers.

18. The process of claim 1 wherein after step (A) is completed additional perester initiator is added and heating of the reaction zone is continued until at least 99 weight percent of the meta/para-isopropenyl-$\alpha,\alpha$-dimethylbenzyl isocyanate monomer is reacted.

19. The process of claim 1 wherein the reactor charge is incrementally added to the reaction zone so that reaction temperature is at least partially maintained in the range of about 100° C. to about 150° C. by the exothermic heat of polymerization.

20. The process of claim 1 wherein the reaction zone contains a solvent for the monomeric reactor charge of step (A) and the copolymer product formed in step (B).

21. The process of claim 17 wherein the solvent in the reactor charge is less than 50 weight percent of the total solvent used in the polymerization process.

22. The process of claim 1 wherein the solvent used in step (A) is a non-isocyanate reactive liquid selected from the group consisting of esters, ketones, ethers, aromatic hydrocarbons, aliphatic hydrocarbon, chlorinated hydrocarbon, and mixtures thereof.

23. The process of claim 1 wherein the solvent is ethyl acetate, butylacetate, toluene, xylene, methyl ethyl ketone, 2-heptanone, 1-methoxy-2-propanol acetate, 1,1,1-trichloroethane and mixtures thereof.

* * * * *